Patented Feb. 19, 1935

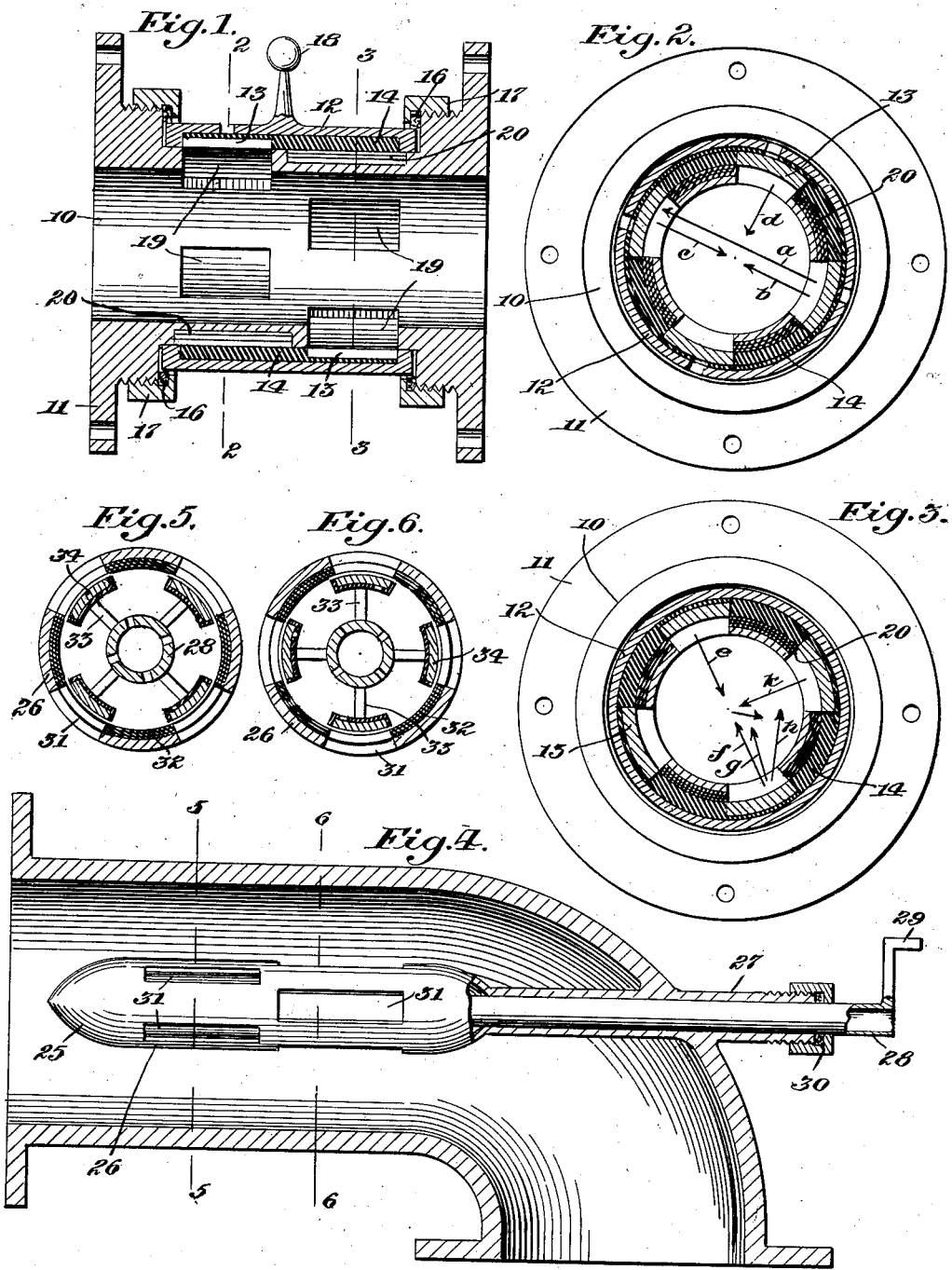

1,991,934

UNITED STATES PATENT OFFICE 1,991,934

APPARATUS AND PROCESS FOR UTILIZING EMANATIONS FROM RADIO-ACTIVE MATERIAL

Harry F. McCray, Reno, Nev.

Application September 23, 1929, Serial No. 394,588

21 Claims. (Cl. 250—34)

This invention relates to the treatment of any substance, with radiations from radio-active material, whereby to effect ionization thereof and atomic, molecular, chemical and physical effects appurtenant to the type of natural element (as found in nature) or any combination thereof subjected to the radiations.

More particularly the invention contemplates the use of a specific chamber in which a substance or fluid may be placed, or through which it may pass under control, and the controlled treatment of a radio-active material such as radium chloride, thorium oxide, radium sulphate precipitated from radium bromide, or the like, and like products generated or developed by them or their combinations.

Again, the process of treating solid, liquid or gaseous substances with such radiations and controlling both the substance being treated and radio-active material is an important feature of this invention.

It is known that while these radiations or rays will penetrate most solid materials, such as stone, metal, glass and so forth, that certain materials are impervious to the rays, or exert an absorbing effect thereon, examples being lead, mica and compounds of aluminum, and these materials may be used as shields for the rays. Accordingly, an object of the present invention is the provision of a chamber in which shields are located and controlled by an operator thereby to provide a control for the radio-active material, and the amount of radiations therefrom.

Another object is the arrangement in such a chamber of means to provide electric insulation, heat control, electric and magnetic fields, strength of and distance between activating agents for the amount and control of activation.

This invention further contemplates the continuous flow or control of a substance through and within the chamber as well as control of heat and the amount of moisture in the substance acted upon, and to these ends, there is provided a sleeve in the chamber for conduction of the treated substance, such sleeve being formed of any suitable material resistant to heat, acids, alkalies, and so forth.

To the attainment of the above, and other objects which will appear as the description proceeds, reference will be made to the accompanying drawing, wherein like elements are designated by like numerals, and in which:—

Fig. 1 is a sectional view through the ionization chamber;

Fig. 2 is a cross-section on line 2—2 of Fig. 1;

Fig. 3 is a cross-section on line 3—3 of Fig. 1;

Fig. 4 is a sectional view, partly in elevation of a modified form of chamber;

Fig. 5 is an enlarged cross section, on line 5—5 of Fig. 4; and

Fig. 6 is an enlarged cross-section on line 6—6 of Fig. 4.

Referring more in detail to the drawing, and to the form of invention shown in Figs. 1 to 3, a chamber 10 is shown in which the substance to be treated is placed, or through which it may pass, and flanges 11 are provided for suitably mounting the chamber. Mounted for rotary or oscillatory movement about the chamber is a sleeve 12, about the inner face of which is countersunk the activating agent 13. Electric insulation 14 is arranged around the interior walls of the sleeve to protect the agent from the sleeve itself.

Each of the various bodies of activating agent is in an electro-magnetic field, which field may be produced in any conventional manner (not specifically shown).

Packing 16, retained in position by packing nuts 17 are desirably used at the ends of sleeve 12 to maintain a sealed relation between the sleeve and chamber.

The sleeve may be operated by a handle 18 or by any other suitable means.

The chamber 10 is provided with ports 19 at spaced intervals about its periphery, adapted to register with an activating agent 13, and the remainder of the chamber, between and around the ports is encased with a shield or insulation 20 of a laminated nature. Since it is advisable to protect the agent from the chamber itself, and to shield the interior of the chamber from the agent, these laminations may be of electric insulating composition, mica, lead and aluminum, the latter, in the present illustration, being the frame or wall of the chamber.

In the showing of Figs. 1 to 3, two series of ports 19 are illustrated, there being four ports in one series arranged in staggered relation to the four ports of the other series.

If desired, instead of encasing the chamber, two series of shields 20 arranged in staggered relation may be utilized, four shields to each series. But in any event, it will be seen, that regardless of the position of the sleeve, whether or not the agent is coincident with a port, the agent is never in contact with metal, but rests upon an electric insulator.

It will be obvious that a movement of handle 18 will suffice to place the activating agent before a port 19 as shown in Figs. 2 and 3, or behind a shield 20, to exclude the rays of the agent from the chamber.

In Figs. 4 to 6, a modified form of apparatus is disclosed, in which the agent, shields and ports are located in a member which is mounted entirely within the ionization chamber, rather than being positioned about the outer wall of the chamber.

In this form, the activating agency is located within and enclosed by a stream-line cylinder 25, which is itself located in an ionization chamber 26, being supported by an integral sleeve 27 projecting on each side of the chamber wall. This sleeve may be rigidly attached to the chamber wall at the point where it passes through, in any suitable manner, as by welding or soldering. A hollow shaft 28, extends through the sleeve 27 into the cylinder 25 and is provided with a handle 29 for manipulative purposes. Packing 30 forms an effective seal between the shaft 28 and the sleeve 27.

As shown in Figs. 5 and 6, the cylinder 25 is provided with ports 31 and insulating shields 32 similar to the ports 19 and shields 20 of the preferred form of invention, while the shaft 28 is provided with spokes 33, at the outer ends of which are mounted the activating agencies 34, suitably insulated electrically from the spokes.

It will be obvious that manipulation of the crank 29 will cause a relative movement between the agencies 34 and the cylinder 25, to place the agencies in position coincident with the ports or with the shields. The staggered series of ports, shields and agencies is similar to that of Figs. 1, 2 and 3.

The invention being thus described, it is believed the operation will be readily apparent. By the staggered arrangement, of Fig. 1, eight agents direct their rays or radiations into the chamber, to impinge against the contents thereof, and against the walls of the chamber. As illustrated by arrows in Figs. 2 and 3 there will be a bombardment of rays in which not only the direct currents $a$ are present, but the counter currents whereby $b$ impinges against $c$, and cross counter currents in which rays $d$ impinge on rays $a$ and on rays $b$ and $c$ at the moment of their impact or collision.

In Fig. 3 examples of oblique currents are shown, in which ray $f$ collides with ray $e$, and after ray $e$ is deflected it collides with ray $g$; also ray $h$ collides with ray $k$. These are a few of the lines of bombardment obtained in the described method or arrangement of the activating agents. With the bombardment is released a shower of electrons from the substance upon which the rays impinge.

While the structure of Figs. 4 to 6 will not provide as many advantages with respect to counter and cross-counter currents, nevertheless there are other advantages of construction and installation with respect to the placement of the chamber.

By making the chamber gas and water tight, the entire apparatus may be immersed in a bath if desired, with the bath, or part thereof circulating through the chamber, while the rays or radiations from a radio-active agent are directed into the chamber.

Advantages and uses of the invention reside in the release of electrons from matter; higher conductivity with less resistance for electric currents in fluids and gases with consequent saving of electric power; better conductivity of flame, gas and heated vapors; benefits to industry in chemistry, metallurgy, recovery of metals, electrolysis, electro-plating, internal combustion engines, explosives, and so forth.

Specifically the device may be used on Diesel engines, oil burners for residences and industrial plants, gas stoves and the like. It may be used in plating works to reduce electric bills, as the ionized gas or fluid reduces resistance to the electricity used.

Having thus described my invention, what I claim as new and desire to secure by Letters Patent of the United States, is:—

1. Apparatus for activating matter with radiations from radio-active material, comprising, a ported chamber in which said matter may be treated, and means mounting radio-active material coincident with said ports whereby radiations therefrom will be directed through the ports into said chamber.

2. Apparatus for activating matter with radiations from a radio-active material, comprising a ported chamber in which said matter may be treated, and movable means mounting radio-active material coincident with said ports whereby radiations therefrom will be directed through the ports into said chamber.

3. Apparatus for activating matter with radiations from a radio-active material, comprising a ported chamber in which said matter may be treated, and movable means mounting radio-active material coincident with said ports whereby radiations therefrom will be directed through the ports into said chamber, said movable means comprising a sleeve encircling said chamber.

4. Apparatus for activating matter with radiations from a radio-active material, comprising, a ported chamber in which said matter may be treated, and movable means mounting radio-active material coincident with said ports whereby radiations therefrom will be directed through the ports into said chamber, said movable means comprising a sleeve encircling said chamber, and means between said sleeve and chamber to insulate said chamber from said sleeve, adjacent said ports.

5. Apparatus for activating matter with radiations from a radio-active material, comprising a ported chamber in which said matter may be treated, and movable means mounting radio-active material coincident with said ports whereby radiations therefrom will be directed through the ports into said chamber, said movable means comprising a sleeve encircling said chamber, and means between said sleeve and chamber to insulate said chamber from said sleeve, adjacent said ports, said radio-active material being insulated from said sleeve.

6. Apparatus for activating matter with radiations from radio-active material, comprising a ported chamber in which said activation may be accomplished, a cylinder disposed in operative relation to said chamber, a radio-active material mounted in said cylinder, in position for exposure to the interior of said chamber, means mounting said cylinder for relative movement with respect to said chamber, whereby said material may be moved from a position where it is freely exposed to the interior of the chamber, through the ports thereof, to a position where the material is insulated from the chamber.

7. Apparatus for activating matter with radiations from radio-active material, comprising a ported chamber in which said activation may be accomplished, means mounting a radio-active material in operative relation to said chamber and for relative movement with respect to said chamber, in position for exposure to the interior thereof, said mounting means being effective to provide a movement of said material from a position where the material is freely exposed to the interior of the chamber through the ports thereof to a position where the material is insulated from the chamber.

8. Apparatus for activating matter with radiations from radio-active material, comprising a ported chamber in which said activation may be accomplished, a cylinder disposed in operative relation to said chamber, a plurality of spaced units of radio-active material mounted in said cylinder, in position for exposure to the interior of said chamber, means mounting said cylinder for relative movement with respect to said chamber, whereby said units may be moved from a position where they are freely exposed to the interior of the chamber, through the ports thereof, to a position where the units are insulated from the chamber.

9. Apparatus for activating matter with radiations from radio-active material, comprising a ported chamber in which said activation may be accomplished, means mounting a plurality of spaced units of radio-active material in operative relation to said chamber in position for exposure to the interior thereof, and for relative movement with respect to said chamber, said mounting means being effective to provide a movement of said units from a position where the units are freely exposed to the interior of the chamber through the ports thereof, to a position where the units are insulated from the chamber.

10. Apparatus for activating matter with radiations from radio-active material, comprising a chamber in which said activation may be accomplished, a cylinder mounted in operative relation to said chamber and having ports arranged in staggered relation therearound, units of radio-active material mounted within said cylinder in a staggered relation corresponding to the ports, and for relative movement with respect to said cylinder, whereby said units may be moved from a position where they are coincident with the ports to a position where they are insulated from the interior of the chamber.

11. Apparatus for activating matter with radiations from radio-active material, comprising a chamber in which said activation may be accomplished, said chamber having ports arranged in staggered relation therearound, a cylinder disposed in operative relation to said chamber and having units of radio-active material mounted thereon in a staggered relation corresponding to the ports, means mounting said cylinder for relative movement with respect to said chamber and ports, whereby said cylinder and units may be moved from a position where the units are coincident with the ports to a position where they are insulated from the interior of the chamber.

12. The method of treating matter which comprises subjecting the matter to the rays of a radio-active material, in moving the matter past the material during the charging thereof, in controlling the rays during such movement of the matter and in directing the rays against each other within the matter thereby to thoroughly irradiate the matter.

13. Apparatus for activating matter with radiations of radio-active material, comprising a chamber in which said activation may be accomplished, a ported cylinder mounted in operative relation to said chamber, a plurality of units of radio-active material mounted in said cylinder, in position for exposure to the interior of the chamber, means for providing relative movement between said cylinder and said material, from a position where said units are freely exposed to the interior of the chamber through the ports of the cylinder, to a position where the units are insulated from the chamber.

14. Apparatus for activating matter with radiations from radio-active material comprising a member provided with ports through which said matter may be treated, and means mounting radio-active material coincident with said ports whereby radiations therefrom will be directed through the ports into said matter.

15. Apparatus for activating matter with radiations from radio-active material comprising a member having a shielded wall, said wall being provided with ports through which said matter may be treated, and means mounting radio-active material coincident with said ports whereby radiations therefrom will be directed through the ports into said matter.

16. Apparatus for activating matter with radiations from radio-active material comprising a ported chamber in which said activation may be accomplished, means mounting a radio-active material for exposure to the interior of said chamber and for relative movement with respect to said chamber, means to insulate the interior of said chamber from said material, said mounting means being effective to provide a movement of said material from a position where the material is freely exposed to the interior of the chamber through the ports thereof to a position where the material is insulated from the chamber.

17. The method of treating matter which comprises subjecting the matter to the rays of a radio-active material continuously, in moving the matter past the material during the subjection thereof to the rays, in controlling the rays during such movement of the matter, and in directing the rays in a plurality of directions against each other, within the matter thereby to thoroughly irradiate the matter.

18. Apparatus for activating matter with radiations from radio-active material, comprising a chamber providing unrestricted movement therethrough of the matter to be activated, whereby the movement of said matter therethrough may be controlled, said chamber having means through which radiations may pass to the interior of the chamber, means mounting radio-active material adjacent said chamber in position for exposure to the interior thereof through said radiation passage means, whereby radiations of the material will be directed into said chamber, said mounting means being movable relative to said chamber to control the amount of radiations directed into said chamber.

19. Apparatus for activating matter with radiations from radio-active material, comprising an ionization chamber constructed and shaped for passage of such matter therethrough and having means through which radiations may pass, to the interior thereof, means mounting a radio-active material adjacent said chamber, in position for exposure to the interior thereof through said radiation passage means, whereby radiations of the material will be directed into said chamber, said mounting means being movable relative to said chamber to control the amount of radiations directed into said chamber.

20. Apparatus for activating matter with radiations from radio-active material, comprising a chamber providing unrestricted movement therethrough of the matter to be activated, means mounting a radio-active material centrally of said chamber in position for exposure to the interior thereof, shielding means adjacent said mounting means, and having an opening through which radiations may pass to the interior of the chamber, said mounting means being movable relative to said shielding means to control the amount of radiations directed into the chamber.

21. Apparatus for activating matter with radiations from radio-active material comprising a chamber providing unrestricted movement therethrough of the matter to be activated and to which said matter may be treated, said chamber having means through which radiations may pass to the interior of the chamber, means mounting a radio-active material adjacent said chamber in position for exposure to the interior of the chamber through said radiation passage means, whereby radiations from the activating material will be directed into said chamber during passage of such matter therethrough, thereby to ionize the matter and produce atomic, molecular, physical and chemical effects appurtenant to the type of natural elements forming the substance of the matter, and shielding means positioned between said material and the interior of the chamber, said mounting means being movable relative to said shielding means and chamber to variably shield the material and thereby control the degree of activation.

HARRY F. McCRAY.